Sept. 15, 1953 R. F. SMELTZER ET AL 2,652,488
SQUELCH CIRCUIT
Filed Dec. 29, 1950
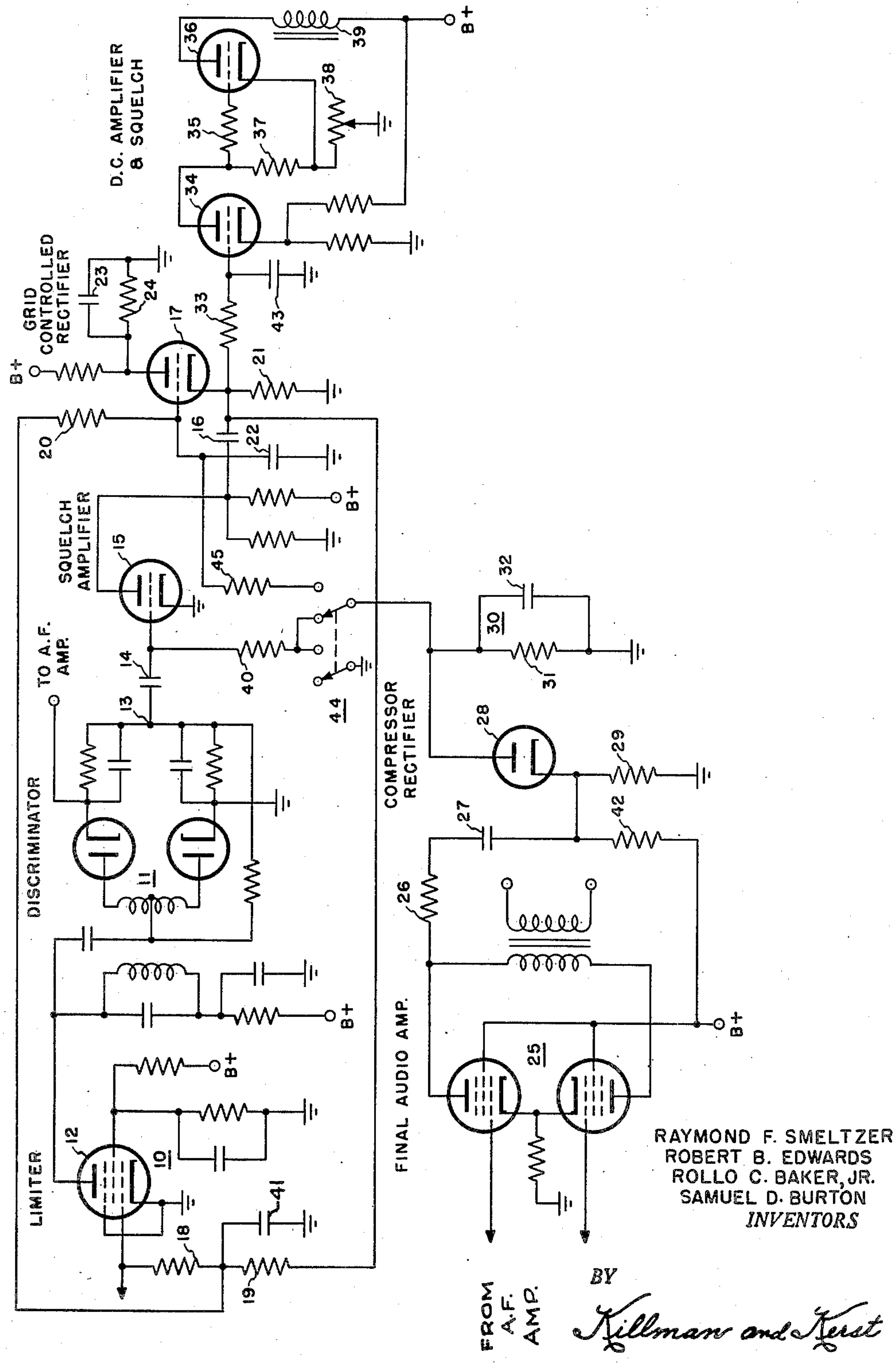
RAYMOND F. SMELTZER
ROBERT B. EDWARDS
ROLLO C. BAKER, JR.
SAMUEL D. BURTON
*INVENTORS*
BY Killman and Kerst Patented Sept. 15, 1953 2,652,488

UNITED STATES PATENT OFFICE 2,652,488

SQUELCH CIRCUIT

Raymond F. Smeltzer, Robert B. Edwards, Rollo C. Baker, Jr., and Samuel D. Burton, Baltimore, Md., assignors to Bendix Aviation Corporation, Towson, Md., a corporation of Delaware Application December 29, 1950, Serial No. 203,472

11 Claims. (Cl. 250—20)

This invention relates to circuits for quieting an angle modulated receiver in the absence of a carrier. It is particularly adaptable to receivers used in mobile service in which use it overcomes the difficulties which are peculiar to the quieting of such receivers.

Various arrangements have been employed in the past in which a potential dependent upon the average energy level of signal plus noise is balanced against a potential derived from noise alone, to sense the condition of a reasonable signal level and signal to noise ratio. Conventionally, noise is distinguished from the desired intelligence by observing one as amplitude variations and the other as frequency variations of the mixed signal and noise. When set to pass very minute signals just above the inherent noise level of the receiver and otherwise free from noise, such arrangements frequently operate when the early portion of the receiver is blocked by a strong signal on a frequency somewhat removed from that to which the receiver is tuned, since this results in removal of the inherent receiver noise. The user, observing this operation but hearing no message, frequently is led to believe that the receiver has failed. Or, if the strong signal is on a closely adjacent channel, some sidebands will pass to produce an uncomfortably strong audio output which is so distorted as to be beyond comprehension. Conversely, when the squelch is set so that it will not recognize a substantial reduction in noise level, it will also fail to recognize a fairly strong signal accompanied by a very moderate amount of noise. In the mobile services where the signal may range from $10^{-7}$ to 10 volts, this fault is particularly troublesome. The system here described is free from this fault, since it recognizes primarily the signal to noise ratio.

With similar devices of the prior art, it often happens that the squelch will fail to recognize a signal that is somewhat detuned, because the intelligence (usually speech) contains distortion products which appear in greater than normal amplitude in the noise amplifier input. This fault is peculiarly prominent in mobile receivers because they employ twenty to thirty tuned circuits in cascade, are fixedly tuned to accept a relatively small percentage bandwidth and are subject to continued vibration. This fault is avoided in the present device by amplifying the audio signal, before it reaches the muting relay circuit, to a high level which is passed to a highly delayed rectifier. When any normal speech level is attained, a fairly large negative output is obtained from the rectifier. This negative output is filtered and applied to the grid of the noise amplifier to reduce its gain, so that the squelch now recognizes primarily the presence of both carrier and speech signals and only secondarily the presence of noise and distortion products.

It frequently happens in mobile service that the signal level and the signal to noise ratio vary rapidly as a result of motion of the vehicle carrying the receiver or of adjacent vehicles. When the variation is through the region of squelch decision, the resultant chopping of the message makes it quite unintelligible. Ideally, since the primary purpose of the squelch is only to protect the user from a constant roar of noise, it should make the signal audible at the first moment that it becomes intelligible and keep it audible through passing phases of unintelligibility until it is discontinued or lost beyond hope of detection. In practice, the circuit application discussed in the last preceding paragraph accomplishes this end, since the carrier is on only for the duration of the message. To avoid the possibility that strong noise might prevent the muting of the receiver upon cessation of the carrier, the bandwidth of the audio amplifier and rectifier circuit is made significantly smaller than the bandwidth of the noise amplifier as measured through the preceding receiver circuits.

Because of the close association of the transmitter and receiver circuits in mobile service, the noise circuits will respond to the local transmitter, thus leaving the squelch potential filter with a large charge which must decay before the receiver can recognize a signal. In this device, this fault is avoided by the circuit arrangement discussed in the last two paragraphs preceding. Its function is to bias the noise amplifier during transmission so that its gain will be very greatly reduced.

It should be noted that the oldest and simplest squelch circuits are generally incapable of distinguishing between noise and a desired signal, responding to a fixed level of either or both in combination. Such squelches have only a limited value in mobile service, where noise and signal levels vary widely. When squelch circuits were arranged to distinguish between noise and signal, the faults described above became evident.

It is accordingly an object of the present invention to provide a squelch circuit which overcomes the deficiencies of squelch circuits of the prior art for mobile service.

It is another object of the invention to provide a squelch circuit which operates primarily on the ratio of signal to noise in the input to the receiver.

It is a further object of the invention to provide a squelch circuit in the operation of which the audio envelope of the signal is utilized to limit the muting effect of the received noise.

In the drawing the single figure is a schematic circuit diagram of a squelch system embodying the invention.

Referring now more particularly to the drawing there is shown a portion of a conventional frequency modulation receiver including a limiter 10 the output of which is fed to a balanced discriminator 11. Since these circuits are of conventional make-up they will not be described in detail. The limiter 10 includes the pentode 12.

The higher frequency components of the carrier envelope are taken from the center tap 13 of the balanced discriminator 11 and applied by way of condenser 14 to the grid of squelch amplifier tube 15. The output of this tube is applied through a condenser 16 to the cathode of a grid controlled rectifier tube 17.

The grid of limiter tube 12 is connected, by way of a pair of resistors 18 and 19 to the cathode of tube 17. The junction of resistors 18 and 19 is connected through a resistor 20 to the grid of tube 17 and to ground through a capacitor 41. The cathode of tube 17 is connected to ground through a resistor 21. The grid of tube 17 is grounded through a capacitor 22 and the plate is connected to ground through a parallel circuit composed of capacitor 23 and resistor 24.

In the lower left hand portion of the drawing is shown the final audio amplifier stage 25 of the receiver. The output of this stage is applied, by way of a resistor 26 and capacitor 27 to the cathode of a diode 28, the cathode being grounded through a resistor 29 and being connected to the plate supply source of the amplifier stage 25 through a resistor 42. The plate is grounded through a parallel circuit 30 including a resistor 31 and capacitor 32. The plate of diode 28 is also connected by way of a switch 44, either to the grid of tube 15 through a resistor 40, or to the grid of rectifier 17 by way of resistor 45.

The cathode of rectifier tube 17 is connected by a resistor 33 to the grid of a D. C. amplifier circuit including tube 34. The grid is grounded through condenser 43. The plate of this tube is connected by a resistor 35 to the grid of an electronic relay tube 36, and by a resistor 37 to the cathode of this tube. The cathode is grounded through a potentiometer 38. A muting or squelch relay coil 39 is connected in the plate circuit of tube 36.

In the operation of the illustrated circuit the higher frequency components of the carrier envelope are taken from the center tap 13 of the discriminator and applied to the grid of the squelch amplifier 15. The output of this amplifier is conveyed to the cathode of rectifier tube 17. Simultaneously a potential derived from rectification of the signal at the grid of the limiter 10 is applied to the grid of the rectifier 17 and about forty percent of the same potential is applied to the cathode of this tube. This potential is negative.

An initial positive potential is obtained at the cathode of tube 17 by virtue of the space current flowing as a result of the positive potential applied to the plate of the tube, since this space current flows through resistor 21. About half of this positive potential is applied to the grid of tube 17 by way of resistors 18 and 19 (in series with the grid-cathode space of tube 12) acting as a voltage divider across resistor 21. The cathode potential of tube 17 is consequently subject to considerable variation. In the absence of a signal it will be initially positive as a result of the space current produced by the steady accelerating potential derived from the plate supply. The plate and grid of this tube are by-passed to ground by the condensers 22 and 23 for the frequency range of noise passed by the amplifier 15 and the cathode to ground impedance will therefore be relatively low. The noise signals developed across resistor 21 will therefore be relatively small and will be rectified inefficiently, if at all, causing at the most a slight increase in the average positive potential of the cathode.

The rectification products of the signal at the grid of the limiter 12 are filtered by the resistance capacitance combination 18 and 41 which removes the audio frequencies at the junction of resistors 18 and 19. The rectified signal carries the average potentials of the grid and cathode of the tube 17 negative at different rates such that when their differences attain the value required to cut-off the flow of the initial plate current the cathode will be negative (with respect to ground) by about two-thirds of this difference, passing through zero at some intermediate point. The cathode circuit of tube 17 now appears as a relatively high impedance load for the amplifier 15 with a consequent increase in its gain and further is conditioned to efficiently rectify noise signals passed by the amplifier. Hence, if the signal is accompanied by noise the cathode will only become negative at a higher signal level. Because of the additional amplification applied to the noise over that applied to the carrier and further because of the action of the limiter in wiping out noise as the signal level increases, there is a rapid transition of the cathode potential of tube 17 from positive to negative as the signal to noise ratio passes through a narrow range fixed by the circuit constants.

The cathode potential of the tube 17 may be used to operate any sort of squelch or muting circuit by appropriate connections with suitable amplification. The D. C. amplifier and relay which have been illustrated here are only representative of such circuits. The potentiometer 38 is used to adjust the squelch circuit to operate to render the receiver active on a negative increment of average cathode potential of tube 17 associated with the signal to noise ratio suited to the service in which the receiver is used. The application of such a negative increment to the grid of tube 34 reduces space current flow through the tube. The resistors 35 and 37 are so proportioned that the reduction in space current flow causes the grid of tube 36 to become more positive with respect to the cathode, thus increasing space current flow through tube 36 and actuating relay 39.

The compressor rectifier 28 is provided with a large delay bias by virtue of the connection of its cathode to the plate supply bus through the voltage divider composed of resistors 29 and 42. This divider causes a fixed portion of the plate supply voltage to be supplied to the cathode of the rectifier. The output of the audio stage is applied to the cathode through resistor, capacitor combination 26, 27, 29 and 42. The time constant of the rectifier circuit is determined by the elements 31, 32. When the intelligence is speech the time constant should be at least a twentieth of a second and of the order of five times that determined by the elements 33 and 43, to provide optimum results. The negative output of the circuit is applied to the grid of noise amplifier tube 15 or to the grid of rectifier 17. The operation of this circuit in either position of the switch 44 reduces the output of the noise rectifier 17 in the presence of normal levels of intelligence and prevents the operation of the squelch by distortion products when a reasonable chance of the intelligibility of the signal is present. Further, it prevents the muting of the receiver during short periods of complete loss of signal or during longer periods of poor signal to noise ratio. Finally, since the final audio amplifier 25 is used as the modulator of the local transmitter, the gain of the noise amplifier 15 is reduced during transmission, so that the filter capacitor 43 will not be charged to an abnormal potential by rectification of the cross-talk in rectifier 17.

What is claimed is:

1. In a radio receiver comprising a muting device, a limiter including rectifying means and a balanced detector having the output of said limiter applied thereto, means for controlling the operation of said muting device comprising means amplifying noise voltages appearing at the output of said balanced detector, means rectifying said amplified noise voltages, means applying said rectified noise voltage to said muting device in a sense to cause said muting device to mute said receiver, and means deriving the envelope of the audio output of said receiver and applying said envelope to said amplifying means in a sense to reduce the gain thereof, the first named means rectifying signal voltage applied to the input of said limiter and applying said rectified signal voltage to said noise voltage rectifying means in a sense to reduce the conductivity thereof.

2. In a radio receiver comprising a muting device, a limiter including rectifying means and a balanced detector having the output of said limiter applied thereto, means for controlling the operation of said muting device comprising a grid controlled rectifier, means applying the output of said rectifier to said muting device to control the operation thereof, a source of voltage, means applying voltage from said source to said rectifier whereby the output of said rectifier operates said muting device to mute said receiver, the first named means rectifying the signal appearing at the input to said limiter and applying it to said rectifier to reduce the conductivity thereof, means amplifying noise voltages appearing at the output of said balanced detector, means applying the output of said amplifying means to said rectifier for rectification thereby, and means deriving the envelope of the audio output of said receiver and applying said envelope to said amplifying means in a sense to reduce the gain thereof.

3. In a radio receiver comprising a limiter including rectifying means, a balanced detector and a muting device having the output of said limiter applied thereto, means for controlling the operation of said muting device comprising a grid controlled rectifier comprising an anode, a cathode and a control grid, means applying the output of said rectifier to said muting device to cause it to mute said receiver, a source of supply voltage, means applying voltages from said source to the anode and cathode of said rectifier in proportions such that said rectifier is rendered conductive thereby and said receiver is muted, the first named means rectifying the signal appearing at the input of said limiter and applying said rectified signal voltage to the grid and cathode of said rectifier in proportions such that a carrier of normal intensity will cause said rectifier to become non-conductive and said receiver to become unmuted, means amplifying the noise voltage appearing at the output of said balanced detector and applying it to said rectifier for rectification and means recovering the envelope of the audio output voltage of said receiver and applying it to said amplifier to reduce the gain thereof.

4. In a radio receiver comprising a muting device, a limiter including rectifying means and a balanced detector having the output of said limiter applied thereto, means for controlling the operation of said muting device comprising means amplifying noise voltages appearing at the output of said balanced detector, means rectifying said amplified noise voltages, said noise voltage amplifying means and said noise voltage rectifying means constituting a control voltage generating means, means applying the control voltage generated by the last named means to said muting device in a sense to cause said muting device to mute said receiver, means deriving the envelope of the audio output of said receiver and applying said envelope to said control voltage generating means in a sense to reduce the output thereof, the first named means rectifying signal voltage applied to the input of said limiter and applying said rectified signal voltage to said noise voltage rectifying means in a sense to reduce the conductivity thereof.

5. In a radio receiver comprising a muting device, a limiter including rectifying means and a balanced detector having the output of said limiter applied thereto, means for controlling the operation of said muting device comprising means amplifying noise voltages appearing at the output of said balanced detector, means rectifying said amplified noise voltages, means applying said rectified noise voltage to said muting device in a sense to cause said muting device to mute said receiver, and means deriving the envelope of the audio output of said receiver and applying said envelope to said rectifying means in a sense to reduce the output thereof, the first named means rectifying signal voltage applied to the input of said limiter and applying said rectified signal voltage to said noise voltage rectifying means in a sense to reduce the conductivity thereof.

6. In a radio receiver comprising a muting device, a limiter including rectifying means and a balanced detector having the output of said limiter applied thereto, means for controlling the operation of said muting device comprising a rectifier, means applying the output of said rectifier to said muting device to cause it to mute said receiver, a source of supply voltage, means impressing voltages from said source on said rectifier such that in the absence of reception by said receiver said rectifier is rendered conductive and the muting of said receiver is effected, the first named means rectifying the signal appearing at the input to the limiter, means applying the rectified signal voltage to said rectifier to render said rectifier non-conductive, thus unmuting said receiver, means amplifying the noise voltage appearing at the output of said balanced detector, and applying the amplified noise voltage to said rectifier for rectification thereby and means deriving the envelope of the audio output of said receiver and applying it to said rectifying means in a sense to reduce the output thereof.

7. In a radio receiver comprising a muting device, a limiter including rectifying means and a balanced detector having the output of said limiter applied thereto, means for controlling the operation of said muting device comprising a grid controlled rectifier, means applying the output of said rectifier to said muting device to control the operation thereof, a source of voltage, means applying voltage from said source to said rectifier whereby the output of said rectifier operates said muting device to mute said receiver, the first named means rectifying the signal appearing at the input to said limiter and applying it to said rectifier to reduce the conductivity thereof, means amplifying noise voltages appearing at the output of said balanced detector, means applying the output of said amplifying means to said rectifier for rectification thereby, and means deriving the envelope of the audio output of said receiver and applying said envelope to said rectifying means in a sense to reduce the output thereof.

8. In a radio receiver comprising a limiter including rectifying means, a balanced detector and a muting device having the output of said limiter applied thereto, means for controlling the operation of said muting device comprising a grid controlled rectifier comprising an anode, a cathode and a control grid, means applying the output of said rectifier to said muting device to cause it to mute said receiver, a source of supply voltage, means applying voltages from said source to the anode and cathode of said rectifier in proportions such that said rectifier is rendered conductive thereby and said receiver is muted, the first named means rectifying the signal appearing at the input of said limiter and applying said rectified signal voltage to the grid and cathode of said rectifier in proportions such that a carrier of normal intensity will cause said rectifier to become non-conductive and said receiver to become unmuted, means amplifying the noise voltage appearing at the output of said balanced detector and applying it to said rectifier for rectification and means recovering the envelope of the audio output voltage of said receiver and applying it to said rectifying means in a sense to reduce the output thereof.

9. A controlled voltage rectification system comprising a space discharge device having an anode, a cathode and a control electrode, a load-circuit coupled to said cathode, a resistor having a high value of resistance connecting said cathode to ground, a source of constant potential connected between said anode and said cathode, a source of bias voltage, means forming a high resistance connection between said source of bias voltage and said control electrode, means forming a high resistance connection between said source of bias voltage and said cathode, a source of alternating current signal voltage, means coupling the last named source to said cathode, the last named source presenting a high impedance to said cathode and said load circuit.

10. A controlled voltage rectification system comprising a space discharge device having an anode, a cathode and a control electrode, a load circuit connected between said anode and said cathode, a resistor having a high value of resistance connecting said cathode to ground, a source of constant potential connected between said anode and said cathode, a source of bias voltage, means forming a high resistance connection between said source of bias voltage and said control electrode, means forming a high resistance connection between said source of bias voltage and said cathode, a source of alternating current signal voltage, means coupling the last named source to said cathode, the last named source presenting a high impedance to said cathode and said load circuit.

11. In a radio receiver comprising a muting device, a limiter including rectifying means and a balanced detector having the output of said limiter applied thereto, means for controlling the operation of said muting device comprising a rectifier, means applying the output of said rectifier to said muting device to cause it to mute said receiver, a source of supply voltage, means applying voltage from said source across the terminals of said rectifier with a polarity to produce a flow of current therethrough, the first named means rectifying the signal appearing at the input to the limiter, means applying the rectified signal voltage to said rectifier to render the same nonconductive, thus unmuting said receiver, means amplifying the noise voltage appearing at the output of said balanced detector, and applying the amplified noise voltage to said rectifier for rectification thereby and means deriving the envelope of the audio output of said receiver and applying it to said amplifying means to reduce the gain thereof.

RAYMOND F. SMELTZER.
ROBERT B. EDWARDS.
ROLLO C. BAKER, Jr.
SAMUEL D. BURTON.

References Cited in the file of this patent

UNITED STATES PATENTS

| Number | Name | Date |
|---|---|---|
| 2,455,450 | Thompson | Dec. 7, 1948 |
| 2,527,617 | Berger | Oct. 31, 1950 |
| 2,531,505 | Deriot | Nov. 28, 1950 |